US007010099B2

(12) United States Patent
Koch et al.

(10) Patent No.: US 7,010,099 B2
(45) Date of Patent: Mar. 7, 2006

(54) METHODS AND SYSTEMS FOR UPDATING A VOICE ACTIVATED DIALING DIRECTORY

(75) Inventors: Robert Koch, Norcross, GA (US); Michael Bishop, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 22 days.

(21) Appl. No.: 10/798,129

(22) Filed: Mar. 11, 2004

(65) Prior Publication Data

US 2005/0201530 A1 Sep. 15, 2005

(51) Int. Cl.
*H04M 1/64* (2006.01)

(52) U.S. Cl. .................................................. 379/88.03

(58) Field of Classification Search ............ 379/88.01, 379/88.03, 201, 88.02; 455/414; 704/275, 704/273, 270

See application file for complete search history.

(56) References Cited

U.S. PATENT DOCUMENTS 6,208,713 B1 * 3/2001 Rahrer et al. ............. 379/67.1
6,393,304 B1 * 5/2002 Meche ....................... 455/563
6,519,479 B1 * 2/2003 Garudadri et al. .......... 455/563

* cited by examiner

*Primary Examiner*—Fan Tsang
*Assistant Examiner*—Olisa Anwah
(74) *Attorney, Agent, or Firm*—Myers Bigel Sibley & Sajovec

(57) ABSTRACT

Updating of VAD directory relating to a call by or to a subscriber and to or from a number not in the VAD directory, or relating to an update communication from subscriber. When the call ends, subscriber may be asked such as by data inquiry whether VAD directory is to be updated with the number. In response to the update communication, subscriber may be asked to identify number to be added to VAD directory. The number to be added may be the last dialed by the subscriber, or may be obtained from a call log relating to subscriber. Upon receipt of an update instruction, subscriber's profile may be checked for address(es) of VAD directory to be updated. A VAD dialing command for the number is obtained. The VAD directory is updated with VAD dialing command and number. Subscriber may be notified of update, and may be asked whether to further update VAD directory.

4 Claims, 2 Drawing Sheets

METHODS AND SYSTEMS FOR UPDATING A VOICE ACTIVATED DIALING DIRECTORY

FIELD OF THE INVENTIONS

The inventions relate to communications, and particularly relate to the voice activated dialing (VAD) of communications.

BACKGROUND

Voice activated dialing (VAD) is a popular time-saving feature available in connection with many communication devices, and typically offered as a service to subscribers. This feature enables a caller to simply speak an instruction such as "Call Michael" into his or her communications unit, and a call is placed to Michael's telephone number. Before the VAD feature may actually be used, however, the subscriber usually must set up a personal VAD directory so that the VAD system is able to carry out the instructions from the caller. The personal VAD directory may include entries with each entry including an identity of a called party or entity and a corresponding telephone number. When the caller speaks the call instruction, the VAD system matches the name or phrase spoken by the caller to an identity in the caller's personal VAD directory, and the call is routed to the telephone number corresponding to the identity.

A problem with the VAD feature is that the extent of its use by a subscriber generally depends on the content of the subscriber's personal VAD directory. If a subscriber gives the VAD instruction of "Call Bob", and there is no match in his or her personal VAD directory, then no VAD call can be made to Bob. Thus, a subscriber with only a few entries in his or her personal VAD directory is limited to making VAD calls to only those few people. Even a user with a lot of entries in his or her personal VAD directory may feel limited because his or her directory may fail to include entries relating to particularly useful or frequently called numbers.

The logical course of action for a subscriber with few entries in a personal VAD directory or a subscriber whose directory fails to include useful, frequently called, or other numbers is to add the appropriate entries. But a hindrance to this logical course of action is the burden imposed on the subscriber in adding such entries to his or her VAD directory.

Typically, to add an entry to a personal VAD directory, a subscriber must first call his or her VAD service provider. The subscriber may have to negotiate his or her way through a maze of telescoping automated call menus to reach the appropriate place for adding an entry to his or her VAD directory. For example, the subscriber may call a service number provided by the VAD service provider and work his or her way through menus that may say something like this:

> "You have reached service provider X. If you are calling about your wireless service, press or say '1'; if you are calling about billing, press or say '2' . . . ; if you are calling about VAD service, press or say '999'."

After pressing "9", the subscriber might hear:

> "If you are calling about billing, press or say '1'; etc."

until the subscriber hears:

> "If you would like to change an entry in your personal VAD directory, press or say '1'; if you would like to delete an entry in your personal VAD directory, press or say '2', or if you would like to add an entry to your personal VAD directory, press or say '3'".

Once the subscriber successfully reaches the appropriate place to add an entry to his or her personal VAD directory, the subscriber may have to carry-out additional actions. For example, the subscriber may have to provide a personal identification number (PIN) or password to gain access to the VAD system to add an entry to his or her personal directory. The subscriber generally has to provide at least two pieces of information: (1) the telephone number for the entry; and (2) a VAD command for associating with the telephone number and for use in implementing the VAD service. To provide the information, the subscriber must know or have the information available. In particular, the subscriber must know or have on hand the telephone number for the entry he or she desires to add to the directory. Also, the subscriber must have a VAD command in mind or on hand for associating with the telephone number. If the subscriber fails to have either piece of information, the VAD service generally is unable to update the subscriber's directory.

Once the subscriber has provided the telephone number and VAD command for the entry to be added, the subscriber may have to take yet further action. In most VAD systems, the subscriber may be requested to confirm the provided information, or take action to make changes. Misunderstanding of the prompts or menus of the VAD system, or errors in providing the information may delay and may complicate the process of adding an entry to a personal VAD directory. If the subscriber experiences difficulties in adding an entry, a service representative may eventually be made available to help the subscriber with the addition of the entry.

Alternatively, the subscriber may be required to update the VAD directory that exists on the subscriber's VAD device. This updating also requires several steps, ant this updating typically requires using a limited set of available keys on the VAD device. In all cases, an additional limitation of the prior art is that these procedures do not allow for any automated offering of VAD directory updating as the result of the occurrence of an event such as an incoming or outgoing call.

The above description of the typical process of adding an entry to a personal VAD directory demonstrates the process can be cumbersome, time-consuming, and confusing. For at least these reasons, many subscribers shy away from using the process of adding an entry to a personal VAD directory. Yet, a VAD service generally is more useful to a subscriber when the subscriber's personal VAD directory is populated with entries relating to persons and entities who are often called by the subscriber, who are important for the subscriber to reach conveniently like the VAD service, and others.

Accordingly, there is a need for a way for a subscriber of a VAD service to easily, quickly, and efficiently update his or her personal VAD directory. There is a particular need for a way for a subscriber to update his or her personal VAD directory without having to negotiate his or her way through a lot of call menus. There is also a particular need for a way for a subscriber to update his or her personal VAD directory with entries relating to people or entities with whom the subscriber often communicates, with whom it is important the subscriber have easy communication access, and with others. There is a further particular need for a way for a subscriber to update his or her personal VAD directory by adding an entry without necessarily having to know or having available to the subscriber the telephone number to be included in the entry.

SUMMARY

Stated generally, the inventions relate to methods and systems for updating a personal voice activated dialing (VAD) directory used in a VAD service. The inventions may allow for updating of a VAD directory in different circumstances. A VAD directory may be updated with an entry relating to a call made by a subscriber, or a call made to a subscriber. In addition, or alternatively, a VAD directory may be updated in response to an update communication received from the subscriber.

With respect to calls that are made by or to a subscriber, an exemplary embodiment of the inventions observes or is informed that such a call has ended. The exemplary embodiment then may query the subscriber as to whether the subscriber's personal VAD directory is to be updated with the number called (when the subscriber made the call) or with the calling number (when the subscriber received the call). As an option, the exemplary embodiment may ask the subscriber whether he or she desires to add or change any other entry in his or her VAD directory.

With respect to an update communication received from the subscriber relating to his or her personal VAD directory, an exemplary embodiment of the inventions may query the subscriber for identification of the telephone number (or other identifier) to be added to the VAD directory. The subscriber may identify the telephone number to be added in a number of ways. The subscriber may provide the telephone number; or the subscriber may specify that the telephone number is the last number dialed by the subscriber. As another alternative, the subscriber may identify the telephone number to be added with reference to a history of calls made to or made by the subscriber. For example, the subscriber may identify that the telephone number to be added as part of the entry to his or her personal VAD directory is the "third number called by the subscriber on Jul. 4, 20XX". The exemplary embodiment may check a call log or other device to identify the number to be added.

In some cases, the subscriber may be able to identify the person or entity rather than the telephone number to be included in the entry to be added to the subscriber's VAD directory. An exemplary embodiment may use the identification to check with other resources to obtain a telephone number (or other identifier) to be associated with the identification in the entry to be added to the subscriber's VAD directory. For example, the subscriber may identify a specific place such as a daycare center. The exemplary embodiment may use the identification to check a service such as a "411" directory or other such database to obtain the telephone number for the daycare center. The telephone number of the daycare center and its identification may be included in an entry added to the subscriber's personal VAD directory even though the subscriber did not provide the telephone number of the daycare center.

A subscriber to a VAD service may use the service with more than one communication device. For example, the subscriber may use the VAD service with a wireline unit (such as a telephone), with a wireless unit (such as a cell or mobile phone), and with other devices. Each of the devices may contain or have access to the subscriber's personal VAD directory. Thus, a change in the subscriber's personal VAD directory may have to be implemented on each of the subscriber's devices. To accomplish the changes with respect to each of the subscriber's devices, an exemplary embodiment of the inventions may maintain a profile of the subscriber. The profile may include information specific to the subscriber, such as a listing and identification of each of the subscriber's devices using the VAD service. The exemplary embodiment may check a subscriber's profile to obtain information relating to the updating of the subscriber's VAD directory, and such information may include the list of the subscriber's devices that are to be updated or provided with the updated information relating to the subscriber's personal VAD directory.

An entry in a personal VAD directory includes generally at least a telephone number associated with a VAD command. When a caller speaks the VAD command, the VAD system matches the spoken VAD command with a VAD command in an entry in the subscriber's personal VAD directory. The VAD call then is routed to the telephone number associated with the VAD command. Thus, the addition of an entry to a subscriber's VAD directory typically requires the subscriber to provide a VAD command for inclusion in the entry. In the exemplary embodiments, the VAD command for an entry to be added to a personal VAD directory is obtained from the subscriber.

The exemplary inventions may carry out additional actions with respect to the updating or adding of an entry to a subscriber's personal VAD directory. For example, an exemplary embodiment may provide the subscriber with a notification or confirmation of the update. As another example, the exemplary embodiment may ask the subscriber whether there are additional entries to be added to the subscriber's personal VAD directory.

Advantageously, the exemplary embodiments of the inventions generally satisfy the needs described in the background set forth above. The exemplary embodiments provide a way for a subscriber of a VAD service to easily, quickly, and efficiently update his or her personal VAD directory. The exemplary embodiments provide a way for a subscriber to update his or her personal VAD directory without having to negotiate his or her way through a lot of call menus. The exemplary embodiments provide a way for a subscriber to update his or her personal VAD directory with entries relating to people or entities with whom the subscriber often communicates, with whom it is important the subscriber have easy communication access, and with others. The exemplary embodiments also provide a way for a subscriber to update his or her personal VAD directory by adding an entry without necessarily having to know or having available to the subscriber the telephone number to be included in the entry.

Other features and advantages of the inventions may be more clearly understood and appreciated from a review of the following detailed description and by reference to the appended drawings and claims.

DETAILED DESCRIPTION

For a subscriber subscribing to a voice activated dialing (VAD) service, the inventions allow for convenient updates to the subscriber's personal VAD directory. Advantageously, the updates may be made in a variety of circumstances such as when the subscriber communicates with the VAD service, when the subscriber is a recipient of a communication, or when the subscriber initiates a communication.

Figure 1:
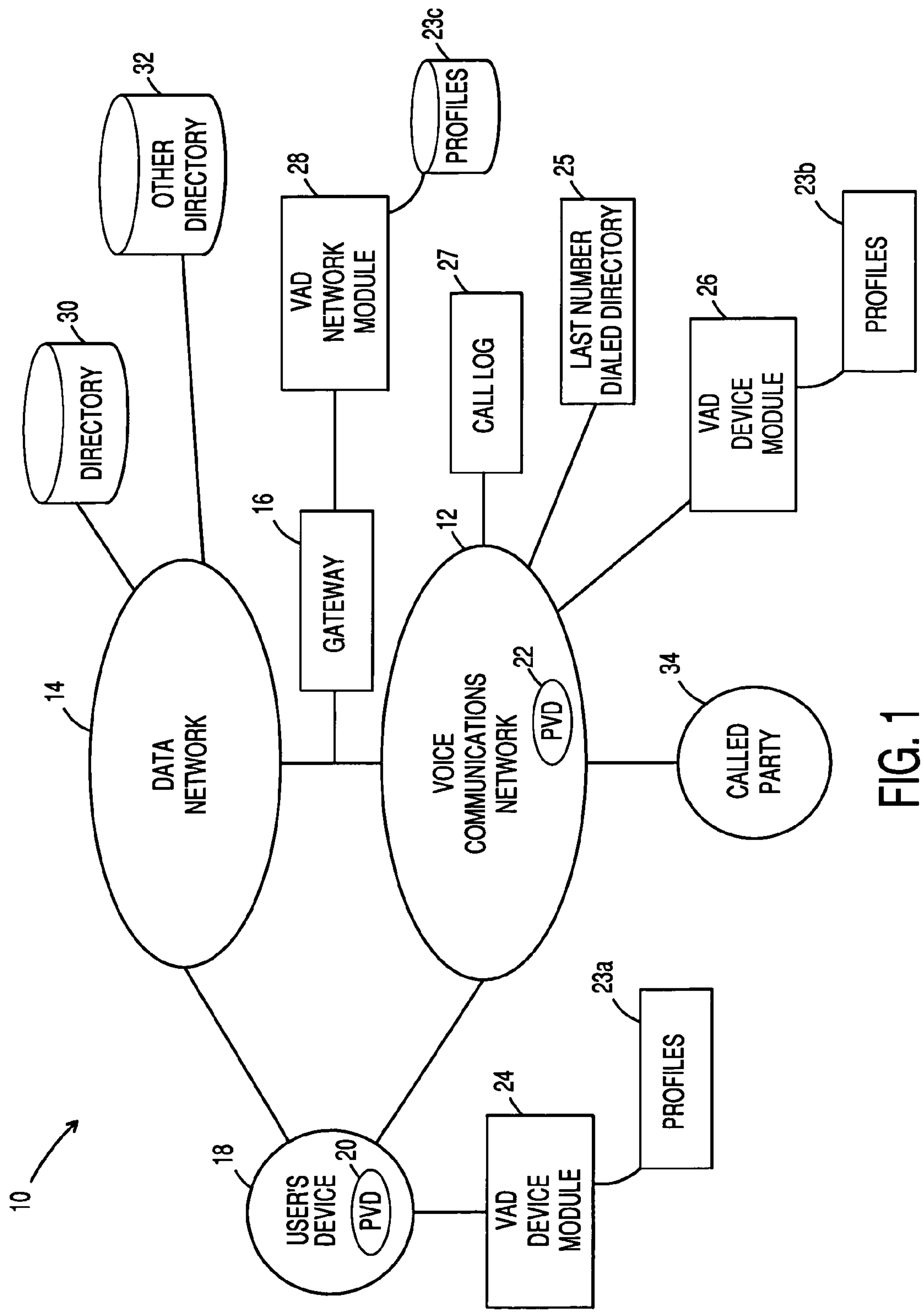
FIG. 1 illustrates an exemplary embodiment of the inventions in an exemplary environment.

FIG. 1—Exemplary Environment

FIG. 1 illustrates an exemplary environment 10 for implementation of an exemplary embodiment of the inventions. A similar environment and similar and other features related to VAD service and systems are presented in the co-pending, commonly owned patent application entitled Methods and Systems for Voice Activated Dialing, filed with the United States Patent and Trademark Office on Dec. 9, 2003 assigned Ser. No. 10/731,307, and incorporated herein by reference.

Referring to FIG. 1, the exemplary environment 10 may include a voice communications network 12 connected to a data network 14. The voice communications network 12 may include, be part of, or be the public switched telephone network (PSTN), wireline network(s), and/or wireless network(s). The data network 14 may be a data communications network such as the Internet, and/or other network. A gateway 16 may be connected to, part of, may be connected between, and/or otherwise enable communications between the voice communications network 12 and the data network 14. As described below, the gateway 16 may include features and functions relating to the exchange of information between the voice communications network 12 and the data network 14, and/or other elements.

FIG. 1 illustrates a user's device 18 connected to the voice communications network 12 and to the data network 14. The illustration represents a user who may be using one or more devices for communications. A user also may be referred to as a caller, a calling party, a customer, or a subscriber. In some cases, the user may be called an originator when the user initiates a communication. The illustration further represents that the one or more of the devices 18 may have a VAD feature (or at least be functional for VAD services), and that the one or more devices may communicate via the voice communications network 12 and/or the data network 14. The user's device may be referred to as a device, a unit, or a communications unit or otherwise. The device may be a telephone or other wireline unit, a wireless unit such as a mobile phone, a pager, a personal digital assistant (PDA), or a computer, or other communications instrument.

When a user subscribes to VAD service, a profile relating to the user as a subscriber may be set up to aid in serving the subscriber. The profile may include preferences of the subscriber in the provision of the VAD service. The profile also may include information on the subscriber's use of the VAD service. For example, a subscriber's profile may include a list of devices used with the VAD service by the subscriber. The profile may include details regarding each device as well as other particulars relating to the subscriber's use of the VAD service. The subscriber's profile may be stored with profiles of other subscribers.

Generally, profiles of subscribers to a VAD service are stored in a location accessible with respect to the provision of the VAD service and with respect to the updating or changing of information in the profiles. Profiles of subscribers may be stored in an element of the VAD system providing the service or otherwise. In the exemplary environment illustrated in FIG. 1, profiles 23*a* of VAD subscribers may be stored in or communicatively connected to a VAD device module 24, which is communicatively connected to the user's device 18. Alternatively, or in addition, profiles 23*b* also may be stored in a VAD device module 26 that is part of or communicatively connected to the voice communications network 12. As yet another alternative, or in addition to either or both of the previous alternatives, profiles 23*c* may be stored in or communicatively connected to a VAD network module 28 communicatively connected through a gateway 16 to the voice communications network 12 and the data network 14. Further details regarding the VAD device modules 24, 26 and the VAD network module 26 are provided below.

As noted in the background, if a user has a device with a VAD feature, prior to the user being able to make a VAD call, a personal VAD directory generally is set up by the user. The personal VAD directory may be included in or associated with one or more devices of the user, or otherwise may be associated with the user. The personal VAD directory may include names for parties and/or destinations that may be called by the user, and corresponding telephone numbers associated with the names and/or destinations. The person or entity to whom a call is directed by the caller may be referred to as the called party, destination, call termination, or call destination.

In some cases, the personal VAD directory may reside in or be directly linked to the user's device such as illustrated in FIG. 1 by the personal VAD directory (PVD) 20 shown within the user's device 18. In other cases, the personal VAD directory may be stored in an element of the voice communications network 12 as shown in FIG. 1 by the personal VAD directory (PVD) 22 illustrated within the voice communications network 12. The personal VAD directory also may be stored in an element communicatively connected to the voice communications network 12 (example not illustrated in FIG. 1).

The personal VAD directory of a user may be communicatively linked to a VAD device module that includes functions relating to VAD services such as instructions placed by the user and/or the routing of VAD calls placed by the user. For example, if the user's personal VAD directory resides in or is directly linked to his or her device 18, such as a personal VAD directory residing in the computer of a user, then an exemplary embodiment of the inventions provides for a VAD device module 24 to reside in or be directly linked to the device 18. Nonetheless, the VAD device module 24 need not necessarily also reside in the computer, but may simply be communicatively linked to the user's personal VAD directory 20. If the user's personal VAD directory resides elsewhere than the user's device 18, such as in an element of the voice communications network 12, then an exemplary embodiment of the inventions provides for the VAD device module 26 to be part of the voice communications network 12. The VAD device module 26 does not necessarily have to be a part of the voice communications network 26, but may be communicatively linked to the personal VAD directory 22.

Whether the VAD device module resides on the user's device 18, in an element of the voice communications network 12, or otherwise, the VAD device module may monitor activities relating to the user's VAD service. For example, the VAD device module may monitor for failure of the user's personal VAD directory to find a directory number for a destination included in a VAD instruction. The VAD instructions may be provided by the user in association with a call. A call associated with a VAD instruction is referred to herein as a VAD call.

For example, assume a user makes a VAD call using device 18. A VAD call is a call initiated by the user providing a VAD instruction such as "Call Michael Bishop" to a receiver of the device 18 instead of dialing a directory number. In some cases, the VAD instruction may be provided by the caller, but no call is created by the user. Rather, the call to the destination in the VAD instruction may be initiated as a result of actions of the VAD device module 26.

A VAD instruction is a directive provided by the user to achieve the result of a communications function such as the calling of a particular party, destination, or entity. A VAD instruction also may be referred to as a VAD command. The VAD instruction may include a statement of the communications function to be carried out such as the "call" function, and may include information as to whom or what to call such as the name or other identification of the party to be called, which may be referred to herein as call destination information or destination information. As used herein, each of the terms "directory number", "directory listing", "call destination number" or "destination number" constitute an identifier for an address or other locator relating to a communications device of a called party. A directory number, call destination number, or destination number may refer to a telephone number, a line number, a called party number, a called number, or directory listing.

Further assume for illustrative purposes the user provides the VAD instruction of "Call Bob Koch", and the user's personal VAD directory fails to find a match to "Bob Koch". In an exemplary embodiment of the inventions, the VAD device module notes the failure and responds by routing the call through the voice communications network 12 via a gateway 16 to a VAD network module 28. In an alternative embodiment, where no call is initiated by the caller, the VAD device module may cause a call to be created and routed as described. As illustrated in FIG. 1, the VAD network module 28 is in a communicable relationship with the gateway 16. The VAD network module 28 may include telecommunications switch capabilities or other features to enable the VAD network module 28 to carry out the actions described herein.

More particularly, assume the personal VAD directory 20 of the user and the exemplary VAD device module 24 reside on or are otherwise in a communicable relationship with the user's device 18. When the user initiates a VAD call, a search is conducted for a match with respect to the destination information provided by the caller in the VAD instruction and the personal VAD directory 20. If there is no match, then the exemplary VAD device module 24 responds by routing the call or by causing the call to be routed through the voice communications network 12 to the gateway 16, and hence to the VAD network module 28. The VAD device module 24 may cause the routing of the call to the VAD network module 28 by providing an identifier such as an address or directory number assigned to the VAD network module 28.

Alternatively, the personal VAD directory 22 of the user and the exemplary VAD device module 26 may reside in or otherwise be in a communicable relationship with an element of the voice communications network 12. When the user initiates a VAD call, the call is received in the voice communications network and a search is conducted for a match with respect to the destination information provided by the caller in the VAD instruction and the personal VAD directory 26. In an alternative embodiment, where there is no call initiated by the caller, but a VAD instruction is received, the search may be conducted with respect to the destination information provided by the caller in the VAD instruction and the personal VAD directory 26. If there is no match, then the exemplary VAD device module 26 responds by routing the call or by causing a call to be routed to the gateway 16, and to the VAD device module 26. The VAD device module 24 may cause the routing of the call to the VAD network module 28 by providing an identifier such as an address or directory number assigned to the VAD network module 28.

As noted above, the call (where the user's personal VAD directory failed to find a match to destination information) (whether initiated by the caller or by the VAD device module) is routed through the gateway 16 to the VAD network module 28. The gateway 16 may be a voice/data gateway such as a VoiceXML Gateway (also referred to as a "voice browser" or VOXML). Further, the gateway 16 may be connected to the voice communications network 12 and the data network 14 through systems that include features or functionalities such as automatic speech recognition (ASR) and/or text-to-speech (TTS) (ASR/TTS). Thus, information associated with the call routed through the gateway 14 such as the VAD instruction ("Call Bob Koch") (also referred to as call destination information), or other information, may be translated into data for use by the VAD network module 28 in obtaining the call destination number.

Upon receipt of the call, the VAD network module 28 may extract information or data associated with the call and use that information or data to obtain the call destination number. In particular, the VAD network module 28 may obtain the call destination information associated with the VAD call and send the call destination information via the gateway 16 to the data network 14, and in particular, to a source of information such as a directory 30 or other directory 32 associated with the data network 14. The directory 30 or other directory 32 may use the call destination information to find a corresponding call destination number. Of course, the call destination information may be concurrently or serially provided to one or more other elements (such as databases, etc.) communicatively connected to the data network 14 for retrieval of a corresponding call destination number.

At some point, additional information relating to the call destination information may be required or desirable to obtain the corresponding call destination number. For example, upon receipt of the call, the VAD network module 28 may determine that information in addition to the destination information is needed to find the destination number. As another example, a directory or other element searching for the called destination number may request additional information of the VAD network module 28 for use in the search. Advantageously, the VAD network module 28 may communicate with the call to obtain the additional information. As explained above, the call is routed by a VAD device module through gateway 16 to the VAD network module 28. The VAD network module 28, therefore, may be linked to the caller and may quickly obtain additional information without having to launch a separate call or query.

For example, the name of the called party may not be enough to find a destination number because the called party's name may be relatively common. The VAD network module 28 may communicate with the caller to obtain geographical information from the VAD call so as to narrow the search for a match. The VAD network module 28 may provide the additional destination information to the directories or other elements searching for the corresponding call destination number.

The directory 30 or other directory 32 may be an information source such as a database or otherwise that includes information such as the names of parties or entities and their respective destination numbers.

In response to receipt of the destination information (and the additional information, if provided), the directory 30 looks for a corresponding destination number. The correspondence between the call destination information and the call destination number typically is a match of some identifying parts. Prior to looking for the match, or at other times, as noted above, the directory 30 may determine additional information is required. The directory 30 may communicate with the VAD network module 28 with respect to the additional destination information. The VAD network module 28 may obtain the additional information from the VAD call, and provide the additional destination information to the directory 30. One or more rounds of requests and supply of additional information may occur between the VAD network module 28 and the VAD call, and/or among the directory 30 (or other element), the VAD network module 28, and/or the VAD call.

In the example described in the previous paragraph, the VAD network module 28 transmits call destination information through gateway 16 to the data network 14 and to the directory 30 to obtain a call destination number. Advantageously, the VAD network module 28 may concurrently transmit the call destination information to more than one directory or source of information (such as to directory 30 and other directory 32, and/or other entity). Alternatively, the VAD network module 28 may consult the directory 30, other directory 32, and/or other entity in series such as in the case of a failure of a previously consulted source to find the corresponding call destination number, or to find the corresponding call destination within a preset time, or in other cases.

Upon finding the corresponding call destination number, the directory 30 (and/or other information source) via the data network 14 sends the corresponding destination number to the VAD network module 28. If the directory (and/or other information source) fails to find the corresponding call destination number, the VAD network module 28 may be informed of such failure.

As noted, the VAD network module 28 may send the destination information (and additional destination information) to a directory different from directory 30 for obtaining the call destination number. FIG. 1 illustrates that an example of such an "other directory" 32 may be accessed via the data network 14, but such another directory may be otherwise situated. The other directory may function similarly to the directory 30 in finding a destination number based on destination information (and additional destination information) provided by the VAD network module 28, and in returning the destination number to the VAD network module 28.

Once a destination number is provided to the VAD network module 28, it causes the VAD call to be routed to the destination number. In the example illustrated in FIG. 1, the VAD network module 28 causes the VAD call to be routed through the voice communications network 12 to the called party 34. By causing the VAD call to be routed to the destination number, the VAD network module 28 drops out of the communications link with the VAD call.

If no destination number is found corresponding to the called destination information, then in an exemplary embodiment, the VAD network module 28 routes the VAD call to an attendant (not illustrated) connected in the voice communications network 12. For example, the VAD network module 28 may cause the VAD call to be routed to a predefined default directory number. Upon connection, the caller may be informed of the failure to find the corresponding destination number and may be prompted for other information or given other options.

In the exemplary method described above, a VAD device module responds to a failure to find a call destination number in a personal VAD directory when a VAD call including call destination information is made or a VAD instruction is received. A response of the VAD device module is to cause the VAD call to be routed through the voice communications network 12 to the gateway 16 and to the VAD network module 28. Alternatively, if no call is received, the VAD device module may initiate a call. The VAD network module 28 takes action to obtain the call destination number from a source other than the personal VAD directory of the user.

In an alternative embodiment, a VAD device module may be configured to respond to all calls in the way the VAD device module is described above as responding with respect to omissions in a personal VAD directory. A VAD device module may be configured to cause all VAD calls to be routed to the VAD network module, and/or all VAD instructions to result in a call that is initiated by the VAD device module and routed to the VAD network module. In other words, in the alternative embodiment, the need for a personal VAD directory may be obviated. For example, a caller places a VAD call or provides a VAD instruction; the VAD device module responds to the VAD call by routing it to the VAD network module and responds to the VAD instruction by initiating a call to the VAD network module; the VAD network module obtains the call destination number from a source through the data network; and the VAD network module causes the VAD call or the initiated call to be routed to the call destination number.

An advantage of the exemplary methods is that the destination number may be added to the personal VAD directory of the caller so that the caller does not have to spend the time nor make the effort of inputting the destination number and associating it with a called party. By adding the destination number and its associated information to the user's personal VAD directory, subsequent VAD calls to the called party having the destination number may be more efficiently and speedily routed. The destination number may be added to the personal VAD directory by the VAD device module. This exemplary method and other methods and systems for updating a personal VAD directory are described in further detail below in connection with FIG. 2.

Figure 2:
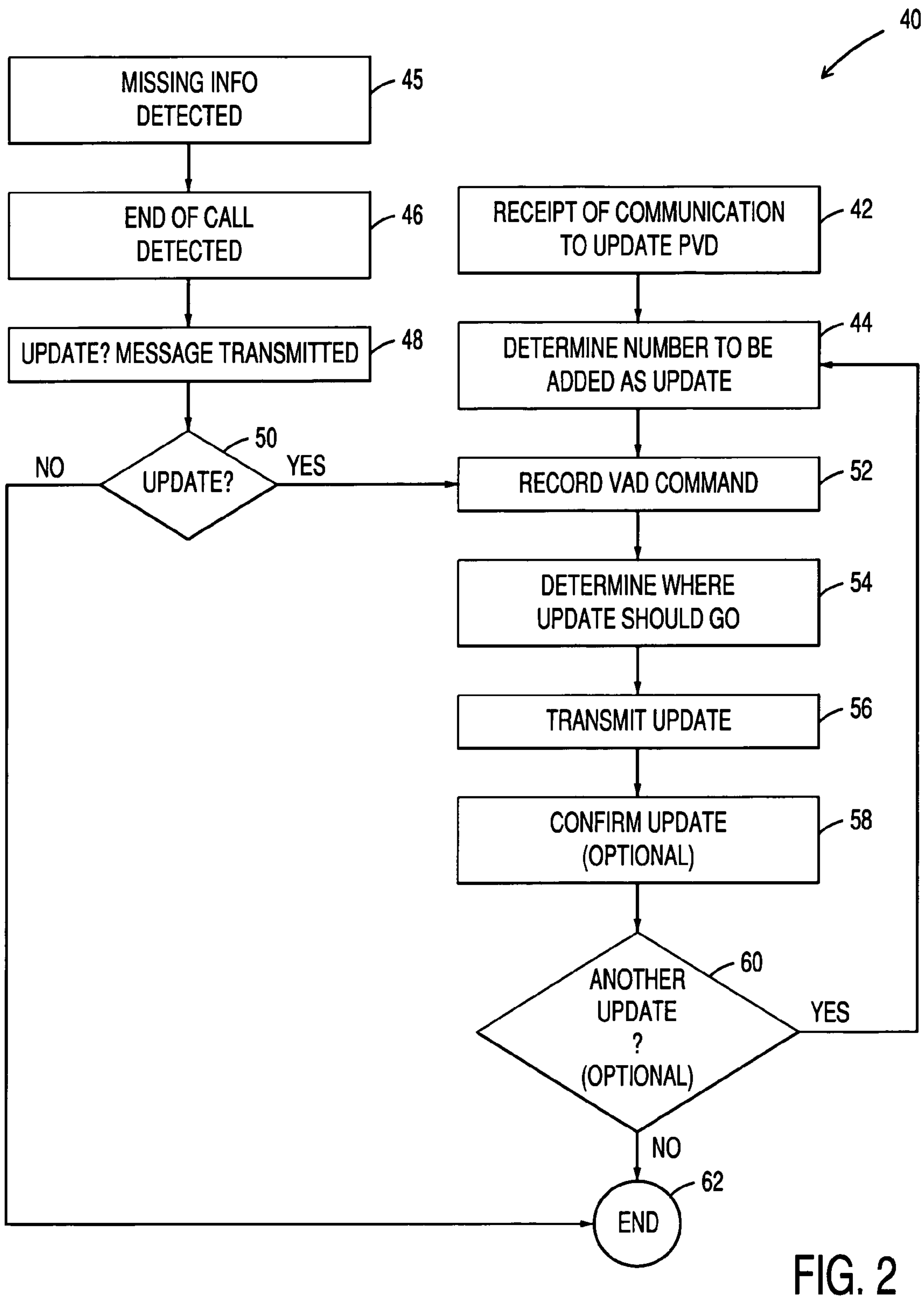
FIG. 2 is a flow diagram illustrating some actions of an exemplary method of the inventions.

FIG. 2—Actions of an Exemplary Embodiment

FIG. 2 is a flow diagram summarizing actions 40 of exemplary embodiments and methods of the inventions. As noted above, the exemplary embodiments may carry out the update of a personal VAD directory in a number of different circumstances. FIG. 2 illustrates a few of these circumstances. The circumstances have actions in common, but generally the common actions occur after initial actions that vary with the respective methods. Thus, the description below provides separate explanations on exemplary initial actions of each circumstance and then the description provides information on the actions common to the circumstances.

One of the circumstances wherein an exemplary embodiment may carry out an update to a subscriber's personal VAD directory is in the circumstance of a subscriber communicating with the VAD service provider as illustrated in action 42. Such a circumstance is referred to herein as the "update communication" circumstance. A subscriber may communicate with a VAD service provider to update his or her personal VAD directory in a number of ways. For example, a subscriber may call the VAD service provider. To facilitate the subscriber's call, the VAD service provider may arrange for a short-cut in dialing such as to set up a feature access code (e.g., *25) for use by subscribers to reach the appropriate place for updating a personal VAD directory. Even though a call has been used as the example of the subscriber's communication with the VAD service provider to update his or her personal VAD directory, the mode of subscriber's communication should not be so limited. The subscriber may communicate with the VAD service provider in any manner that may be effective to update the subscriber's directory per the exemplary embodiments of the inventions.

The update communication circumstance is illustrated in FIG. 2 beginning with action 42. In this action, the subscriber's communication to update his or her personal VAD directory is received. In the following action 44, a determination is made as to the subject matter that is to be updated or otherwise changed in the subscriber's directory. Among the possible updates, the subscriber may add an entry to his or her personal VAD directory. An entry includes at least: (1) an identification of a person or entity such as by telephone number as the call destination; and (2) an associated VAD command. The determination of action 44 may be carried out by asking the subscriber for the information such as the telephone number for the entry to be added. The subscriber may be asked via voice announcement, by data query, or otherwise. In response, the subscriber may provide the telephone number. The telephone number also may be referred to as the call destination number.

In some cases, the subscriber may be unable to provide a telephone number or other identifying address to be included in the entry. Advantageously, the exemplary embodiment allows the subscriber to specify a call destination number by reference to one or more of its characteristics. For example, the subscriber may identify the number to be added to his or her directory as the last number the subscriber dialed. To obtain the last number dialed by the subscriber, the exemplary embodiment may consult a last number dialed directory 25, which typically is an element or connected to the voice communications network 12 as illustrated in FIG. 1.

As another example, the subscriber may identify the number to be added to his or her personal VAD directory by reference to a history of calls made to or made by the subscriber. The subscriber may identify the telephone number as the "third number called by the subscriber on Jul. 4, 20XX". The exemplary embodiment may check a call log 27 or other device to identify the number to be added. A call log 27 relating to a subscriber typically is part of or connected to the voice communications network 12 as illustrated in FIG. 1.

As yet another example, a subscriber may desire to add an entry to his or her personal VAD directory relating to a favorite restaurant such as Mary Mac's Tea Room. Even though the subscriber knows the name of the restaurant, the subscriber may not know or may not have ready access to the telephone number of the restaurant. The exemplary embodiment may provide the subscriber with the option of having the VAD system find a telephone number for the restaurant. The VAD system may find the telephone number from resources and/or pursuant to the manner described generally above in obtaining a telephone number when the person or entity is not included in the subscriber's personal VAD directory. Additional details on the manner the VAD system may obtain the telephone number are provided in the previously referenced patent application entitled Methods and Systems for Voice Activated Dialing.

Prior to a description of actions following action 44 of the exemplary embodiment in the update communication circumstance, initial actions relating to other circumstances of updating a personal VAD directory are described.

Two of the other circumstances of updating a personal VAD directory according to the exemplary embodiments arise in connection with a call made to a subscriber or a call made by a subscriber. These two circumstances have initial actions in common and so are referred to herein by the common term of "call to/from circumstances".

In the call to/from circumstances, a subscriber may be engaged in a communication (whether made to or made by the subscriber). Information relating to the person/entity with whom the subscriber is communicating may be missing from the subscriber's personal VAD directory. An exemplary embodiment of the inventions checks whether information relating to the person/entity with whom the subscriber is communicating is missing. To determine whether the information is missing, the exemplary embodiment may communicate with the appropriate elements of the voice communications network 12 to obtain information relating to the person/entity with whom the subscriber is communicating. The obtained information may be compared to the subscriber's personal VAD directory for a match. If there is a match, then the exemplary embodiment may discontinue its effort to update the subscriber's personal VAD directory. On the other hand, if there is no match, then a determination is made that the information relating to the person/entity with whom the subscriber is communicating is missing.

If such missing information is detected as noted in action 45 of FIG. 2, then the exemplary embodiment may wait for the subscriber's call to end. Other embodiments of the inventions do not necessarily wait for the end of a subscriber's call or communication, but may carry out the subsequent actions described below while the communication is on-going, or even before the communication has begun or the call has been terminated to its destination.

In the exemplary embodiment, once the end of the call is detected in action 46, then an update query may be transmitted to the subscriber as noted in action 48. The update query may take a variety of modes depending upon the communication modes of the subscriber. As examples, the update query may be a voice announcement if the subscriber is using a telephone, or a data message if the subscriber is using a voice/data or data device. In action 50, the exemplary embodiment checks whether a response has been received to its update query of action 48. If the response is negative (or if there is no response), then the exemplary method ends in action 62. If the response is positive, then the actions of the exemplary embodiments in the call to/from circumstances are common to the exemplary embodiment of the update communication circumstance as described below.

Whether updating a personal VAD directory occurs in the update communication or in the call to/from circumstances, after the respective initial actions described above, the exemplary embodiments include common actions. The first common action 52 is that of recording a VAD command as shown in FIG. 2. As explained above, an entry in a personal VAD directory generally includes a call destination number and a VAD command. The VAD system compares a VAD command received as part of a VAD call from a subscriber to the VAD commands in the entries of the subscriber's personal VAD directory. Thus, in setting up an entry for the directory, a subscriber provides a VAD command that is recorded (or otherwise captured) and stored as part of the entry to be added to the subscriber's directory.

Once the call destination number and the VAD command is obtained for the entry, the exemplary embodiment may check, as illustrated in action 54 of FIG. 2, of determining what to do with the entry. Adding the entry to the subscriber's personal VAD directory is the logical answer to the question of what to do with the entry, but the subscriber may have his or her personal VAD directory stored in more than one place. Thus, a question arises as to what to do with the entry regarding the multiple storage places of the subscriber's personal VAD directory.

For example, the subscriber may have his or her directory stored in each one of two or more devices the subscriber may use with the VAD service. To keep each of the personal VAD directories current, the exemplary embodiment updates each directory with the new information. In order to be able to carry out the appropriate updates, the exemplary embodiment keeps a profile regarding each subscriber. Among the information contained in a subscriber's profile may be identification of all of the subscriber's VAD devices to be updated. The identification may be by address or other identifier of each VAD device. As described above in connection with FIG. 1, the subscriber's profile may be stored by the exemplary embodiment with other subscriber's profiles in one or more places such as in the VAD network module 28, in VAD device modules 24, 26, or in other places.

Having determined in action 54 of FIG. 2 where the entry updating the subscriber's personal VAD directory is to go, in action 56 the entry is transmitted accordingly.

After transmission of the entry updating the subscriber's personal VAD directory, the exemplary embodiment includes two optional actions. As a first optional action 58, the exemplary embodiment may send a confirmation to the subscriber that his or her personal VAD directory has been updated. The confirmation may be made in a variety of ways including a voice announcement, a data message, etc.; depending on the communication modes of the subscriber with the VAD system.

The other optional action 60 of the exemplary embodiment is that of checking with the subscriber as to whether another update is to be made to his or her personal directory. The check may be carried out in a variety ways including a voice announcement, a data message, etc., depending on the communication modes of the subscriber with the VAD system. If the response to the check of action 60 is positive, then the exemplary embodiment returns to action 44 of determining which number is to be added as an update and subsequent actions as appropriate. If the response to the check is negative, then the exemplary method ends in action 62.

CONCLUSION

From the foregoing description of the exemplary embodiments of the inventions and operation thereof, other embodiments will suggest themselves to those skilled in the art. Therefore, the scope of the inventions is to be limited only by the claims below and equivalents thereof.

We claim:

1. A method for updating a voice activated dialing (VAD) directory, comprising:

receiving an instruction to update the VAD directory by reference to at least one characteristic of a call destination number other than the call destination number itself;

determining a call destination number to be included as part of an update to the VAD directory based upon the at least one characteristic of the call destination number other than the call destination number itself;

recording a VAD command for the call destination number that was determined; and updating the VAD directory with the update including the VAD command associated with the call destination number that was determined;

wherein the at least one characteristic of the call destination number other than the call destination number itself comprises a date on which the call destination number was called and a sequence identification of the call destination number on the date.

2. The method of claim 1, further comprising:

after updating the VAD directory with the update, checking whether to update the VAD directory with another update.

3. The method of claim 1 wherein the VAD directory is a first VAD directory, and wherein the method further comprises:

updating a second VAD directory with an update including the VAD command associated with the call destination number.

4. A system that is configured to perform the method of claim 1.

* * * * *